United States Patent Office 3,529,673
Patented Sept. 22, 1970

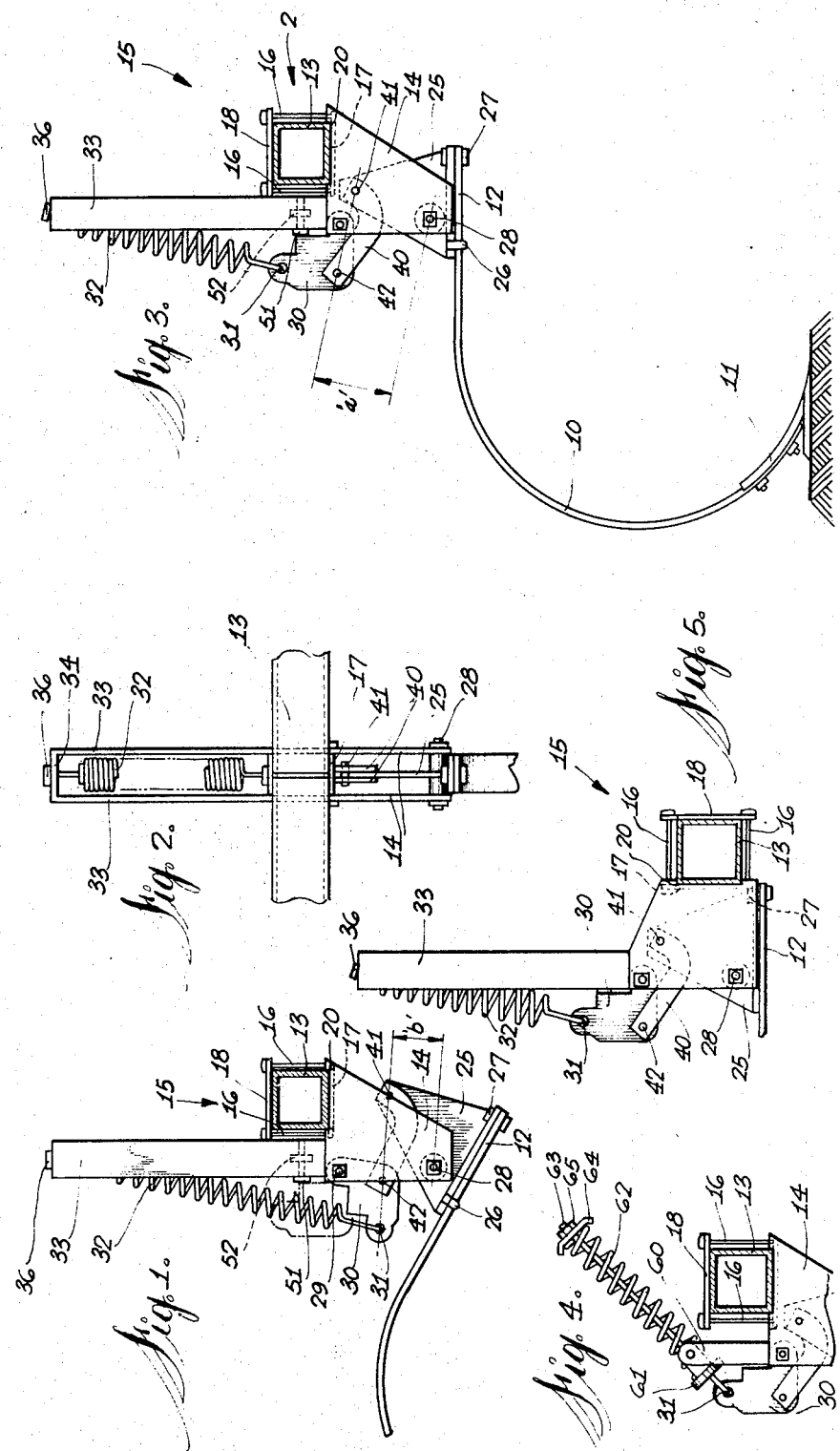

3,529,673
TRIP ATTACHMENT FOR MOUNTING
CULTIVATING TOOLS
George H. Morris, Yorkton, Saskatchewan, Canada, assignor to Morris Rod-Weeder Co. Ltd., Yorkton, Saskatchewan, Canada
Filed July 5, 1968, Ser. No. 742,893
Claims priority, application Canada, July 14, 1967, 995,474
Int. Cl. A01b 35/24, 61/00
U.S. Cl. 172—266                                    4 Claims

ABSTRACT OF THE DISCLOSURE

A trip mechanism for attachment of earth working tools to the tool bar of agricultural and horticultural machines, the mechanism allowing the tool to deflect upwards on meeting an obstruction to pass over the obstruction, the tool being resiliently biased into a downward, operative position, the mechanism arranged so that, at the most, only a slight increase in loading occurs, on the tool, when the mechanism trips.

It is necessary that the mounting mechanism is compact, as it is often desirable to mount several tools in close proximity. The mounting should be applicable to various types of tools and be readily used on various types of machines.

It is also a desirable feature that the trip mechanism be capable of being proportioned that the load on the tool does not increase, to any substantial amount, on deflection of the tool, and it is often desirable that the load on the tool be decreased on deflection. The present invention also provides for such loading arrangements to be achieved.

SUMMARY OF THE INVENTION

A trip mechanism for attachment of a tool to a tool bar of a cultivator, the tool having a working end and a shank, the mechanism having a support plate for clamping to the tool bar, a support lever for attachment to the shank of the tool, pivot means attaching the support lever at its lower end to the lower end of the support plate, a load lever pivotally attached at one end to the support plate at a position above the lower end thereof and extending rearwardly, a connecting lever pivotally connected between the support lever and the load lever, the connecting lever connected at one end to the support lever towards the upper end thereof and connected at its other end to the load lever at a position intermediate the ends thereof, and resilient loading means connected to the end of the load lever remote from its place of attachment to the support plate and biasing said load lever about its place of attachment to the support plate in a direction to move upwardly the end to which said loading means is attached; the arrangement such that upward deflection of the working end of a tool will produce forward displacement of the upper end of the support lever and pivotal movement of the load lever downwardly against said bias.

The invention will readily be understood by the following description in conjunction with the accompanying drawings, in which:

FIG. 1 is a side view of a tool mounted on a tool bar, the tool in a deflected or retracted position, FIG. 2 is a view in the direction of the arrow 2 in FIG. 3, FIG. 3 is a side view, as in FIG. 1, but with the tool in the operating position, FIG. 4 is a partial side view of an alternative embodiment, and FIG. 5 is a partial side view of a modification.

As illustrated in the drawings, a tool 10, having a working end 11, and a shank 12, is mounted on the tool bar 13. The tool bar 13 is of square tubular section and is normally part of a machine, not shown. The particular tool 10 illustrated is fitted at the working end 11 with a cultivator sweep, but other tools can readily be used.

Attached to the tool bar 13 are two parallel spaced apart support plates 14. The support plates 14 are attached by means of a clamp 15. The clamp 15 comprises two bolts 16 threaded into a plate 17 welded or otherwise attached to the support plates 14, beneath the tool bar. The bolts 16 are positioned one on each side of the tool bar and a top plate 18 passes over the top of the tool bar 13, the whole being firmly clamped by the bolts being screwed tightly into the plate 17. To improve location, and security of attachment, the support plates 14 have recesses 20 in their top edges for the reception of the lower part of the tool bar 13.

Attached to the shank 12 is a support lever 25, the shank passing through a loop 26 and fastened by a bolt 27. The support lever is pivotally supported by a pivot 28 positioned adjacent the shank 12 and at the lower end of the support plates 14. Thus the support lever pivotally mounts the tool 10 on the support plates 14 and thus from the tool bar 13.

Spaced upwardly from the pivot 28 is a further pivot 29. Pivot 29 pivotally attaches one end of a load lever 30 to the support plates 14. The load lever 30, in the embodiment illustrated, is somewhat of the form of a bellcrank lever and the lever extends rearwardly from the support plates 14. The other end of load lever 30 is attached at 31 to a loading means comprising a tension spring 32. Extending upwardly from the support plates 14 are two spaced apart members 33 connected at their upper ends by cross-plate 34. An internally threaded member 35 is attached to the end of the spring remote from its position of attachment to the load lever, such as by screwing into the spring, and a bolt 36 screws into the member 35 and passes through a hole in the cross-plate 34. The bolt 36 provides means for adjusting the loading of the spring 32.

A pair of connecting levers 40 connect support lever 25 to load lever 30. The levers 40 are also of a bellcrank, or bent, formation, in the embodiment illustrated, for the levers to pass below pivot 29. The levers 40 are connected at one end by a pivot 41 to the support lever 25 at a position on the support lever spaced upwardly from the shank 12 and also the pivot 28. The other ends of the levers 40 are connected to the load lever 30 by a pivot 42, at a position intermediate the ends of the load lever 30.

The operation of the trip mechanism can readily be appreciated from FIGS. 1 and 3. With the tool in the normal working position, as indicated in FIG. 3, the load lever 30 is in the position shown in FIG. 3, that is upward relative to the support plates 14. When the end 11 of the tool 10 meets an obstruction, the tool pivots rearwards and upwards about pivot 28. This movement also pivots support lever 25 about pivot 28, the upper end moving in a forward direction. Movement of the upper end of the support lever 25 forwards, pulls connecting levers 40 in a forward direction and therefore pivoting load lever 30 about pivot 29. Pivoting of the load lever moves the end attached to the spring 32, downwards, against the load of the spring.

The mechanism is compact and easily and quickly installed on and removed from a machine. Several of the mechanisms can be mounted close to each other and access to the bottom and rear only of the tool bar is necessary. There may be several tool bars on a machine.

On initial contact with an obstacle, there is deflection of the shank of the tool without any movement of the support lever, connecting levers and the remainder of the mechanism. This increases the loading on the tool as a whole and eventually movement of the mechanism does occur. The invention provides a mechanism which can be arranged to trip at this loading of the tool, and which can trip with three results, either with a slight further increase in loading, with no increase in loading; or with some decrease in loading. Also, the invention provides means for setting a datum loading at which the trip operates, and also the characteristics of the loading on the tool when the trip operates.

The actual geometry of the various levers and pivots sets the overall characteristics of the mechanism. It will be appreciated that operation of the trip produces extension of spring 32 and increase in the load applied by the spring. By suitably arranging the various moment arms, the increased load exerted by the spring can be partly or completely offset, or even more than offset.

Considering FIGS. 1 and 3, and firstly taking FIG. 3, the spring load is applied through load lever 30 to connecting levers 40 and tends to move levers 40 rearwards, that is, to the left in FIG. 3. The connecting levers 40 transfer the load to the support lever 25 tending to rotate this lever about pivot 28. The pull of the connecting levers is approximately horizontal and rearwards. The moment arm is the perpendicular distance between the line of action of the pull and the pivot 28. In FIG. 3, this is represented by the distance a. FIG. 1 illustrates the deflected position and it will be seen that the moment arm is now much reduced, being represented by b.

This reduction in moment arm can be arranged to substantially offset the increase in spring loading by deflection of the tool, thus producing substantially no alternation in the loading at the tool working end. Alternatively, the increase in spring loading can be more than offset, reducing the load on deflection, or only partly offset the increase, thus allowing some increase in tool loading. These variations are obtained by varying the relative length of the levers, and the relative dispositions of the pivots.

The above description is concerned with the variation of loading after the mechanism has tripped. The invention also provides for setting the datum load at which the trip mechanism operates and also the characteristics of the loading at trip operation. To set a datum position of the trip mechanism, a stop 50 is provided. The stop 50, as illustrated, comprises a screw 51 carried in a threaded hole in a plate 52 extending between the lower ends of the spaced apart members 33. The screw can be rotated in plate 52 so that the head of the screw projects more or les from the plate. Variation in the position of the head of the screw varies the position to which load lever 30 is biased by the spring 32, and thus varies the basic geometry of the levers in the undeflected position.

The main relationship set by the stop 50 is the relative positioning of pivots 41 and 42. By suitably adjusting the stop 50, a line through pivots 41 and 42 will be perpendicular to the line of action of the spring 32. From this position, the arrangement can be caused to have an overcentre action by screwing in the screw 51. The trip can be caused to reach a set position before the line through pivots 41 and 42 becomes perpendicular to the spring by screwing the screw 51 outwards. Such variations in the position of the stop affect the breaking load of the trip, and the characteristics of the load at breaking. Further adjustments of breaking load can also be made by nut 36.

However, if no variation in the breaking action of the trip is required, a fixed stop 50 can be provided.

FIGS. 1, 2 and 3 illustrate one embodiment of the invention, and it will be readily appreciated that considerable variation of the arrangement shown, can be made. A typical alternative is to use a compression spring instead of a tension spring. A typical arrangement of a compresion spring mechanism is illustrated in FIG. 4. This figure only illustrates the modified form of mounting for the spring, the rest of the mechanism being as in FIGS. 1, 2 and 3.

Extending from the support plates 14, are two short parallel, spaced apart, members 60. Pivotally supported between the upper ends of the members 60 in a housiig 61 in which is housed the lower end of spring 62. The housing has a hole axially therethrough and a pull rod 63 extends through the housing and also up through the spring. At its lower end the pull rod 63 is attached at 31 to load lever 30. At the upper end of the spring is a cap member 64. The upper end of the rod 63 is threaded and a nut 65 positions the cap member 64 on the rod 63, and also provides means for varying the initial setting of the spring load.

In FIG. 4, the spring 62 is shown inclined. Both the spring 62, and the spring 32 of FIGS. 1, 2 and 3, can be arranged to be vertical or inclined to the vertical in either direction, forward or back. Such variation in the disposition of the spring may be desirable for installation reasons. It also provides a further means for varying the moment arm of the spring when applying a load to the load lever 30.

Forms of resilient loading devices, other than the spiral springs illustrated, can readily be used, for example rubber or similar resilient material under tension or compression.

FIG. 5 illustrates a variation in which the support plates 14 are attached to the rear of the tool bar 13, instead of beneath the tool bar. It will be seen that, apart from a different shape of support plate, the apparatus is the same as illustrated in FIGS. 1, 2 and 3, and similar reference numbers are used.

Other variations are readily made, for example, a single support plate 14 can be used. Also only a single connecting lever 40 need be provided. To provide efficient assembly, with pairs of support plates or pairs of connecting levers, the pivots have lengths of tubular material extending between the plates, or levers, so that the assembly can be clamped tight at the pivots. The particular members pivoting on the pivots, rotate on the tubular pieces but are of reduced width so as to move freely.

I claim:

1. A trip mounting for a cultivator having a normally horizontal tool bar and a unitary tool having a forward end portion and rearward end portion terminating in a normally horizontal shank, which comprises, means disposed between said shank and tool bar for suspending said tool from said tool bar comprising (a) a pair of spaced apart support plates fixedly secured to and extending downwardly from said tool bar, (b) a support lever fixedly secured to said shank and extending upwardly therefrom between said plates, and (c) pivot means pivotally attaching said support lever to said support plates at a first point adjacent said shank;

a load lever having first and second arms in angular relation to each other, said first arm extending between said support plates and having a pivotal attachment thereto at a second point adjacent said tool bar and above said first point, and said second arm extending rearwardly from said support plates;

a spring support frame in fixed relation to said tool bar and extending in a direction away from said tool;

spring means mounted on said support frame and connected to said second lever arm; and a connecting lever disposed between said support plates and having a first arm pivotally connected to said load lever at a point between said arms thereof and a second arm in angular relation to said first connecting lever arm pivotally connected to said support lever at a point above said first point;

said pivot means, said pivotal attachment, and said spring support frame being substantially perpendicularly aligned with respect to said shank.

2. A trip mounting for a cultivator as defined in claim 1, said spring means comprising a coil spring having one end connection to said support member and its other end connected to said second load lever arm.

3. A trip mounting for a cultivator as defined in claim 1, said spring means comprising a seat member pivotally connected to said support frame, a coil spring having one end seated on said seat member, and a pull rod having one end pivotally connected to said second load lever arm and a shoulder on its other end, said coil spring having its other end seated on said shoulder.

4. A trip mounting for a cultivator as defined in claim 1, including stop support means mounted in fixed relation to said tool bar and rearwardly thereof, and a stop adjustably mounted in said stop support means and engageable by said load lever pursuant to rotative movement thereof.

References Cited

UNITED STATES PATENTS

| | | | |
|---|---|---|---|
| 460,828 | 10/1891 | Kraus | 172—268 |
| 2,944,613 | 7/1960 | Anderson | 172—710 X |
| 3,223,175 | 12/1965 | Twidale | 172—264 |

FOREIGN PATENTS

| | | |
|---|---|---|
| 714,318 | 7/1965 | Canada. |

ROBERT E. BAGWILL, Primary Examiner

S. C. PELLEGRINO, Assistant Examiner

U.S. Cl. X.R.

172—710; 306—1.5